United States Patent [19]

Iida

[11] Patent Number: 4,605,593

[45] Date of Patent: Aug. 12, 1986

[54] PRESSURE SENSITIVE TRANSFERRING MEMBER

[75] Inventor: Fumio Iida, Nagareyama, Japan

[73] Assignee: Canon Kabushiki Kaisha, Tokyo, Japan

[21] Appl. No.: 770,304

[22] Filed: Aug. 27, 1985

[30] Foreign Application Priority Data

Sep. 4, 1984 [JP] Japan ........................ 59-183669
Dec. 15, 1984 [JP] Japan ........................ 59-264758

[51] Int. Cl.⁴ ........................ C09J 7/02

[52] U.S. Cl. ........................ 428/352; 156/230; 156/234; 428/343; 428/355

[58] Field of Search ........................ 428/352, 343, 355; 156/230, 234

*Primary Examiner*—Thomas J. Herbert
*Attorney, Agent, or Firm*—Fitzpatrick, Cella, Harper & Scinto

[57] ABSTRACT

A pressure sensitive transfer member comprises a flexible plastic film substrate and a pressure sensitive transferring image forming layer comprising a binder resin, a plasticizer for the binder resin and a coloring agent and overlying the flexible plastic film substrate the plasticizer being oleyl oleate.

6 Claims, No Drawings

PRESSURE SENSITIVE TRANSFERRING MEMBER

BACKGROUND OF THE INVENTION

1. Field of the Invention

This invention relates to a so-called pressure sensitive transferring member such as a pressure sensitive ink ribbon and the like, and more particularly, to a correctable pressure sensitive transferring member or ink ribbon having improved pressure sensitive property and correction property due to an improved ink layer.

2. Description of the Prior Art

Correctable ink ribbons have been developed for enabling the correction of mistakenly typewritten letters. Such correctable ink ribbons are usually constituted of a pressure sensitive transferable ink layer formed on a film substrate. In a typewriter using such a correctable ink ribbon. A cohesive ribbon or tape for correction difficult from the ink ribbon is superposed on a mistakenly recorded transferred ink image, and typewriting is effected again to remove the mistakenly recorded transferred ink image from a recording medium such as typewriting paper. A correct ink image is, then, typewritten on the removed portion by using the ink ribbon again resulting in correction of record.

The correctable ink ribbon in involved in transferring and, if necessary, correcting the transferred image and transferring again, and the like.

Therefore, the correctable ink ribbon should have a characteristic that the mistakenly recorded transferred image can be easily removed by a cohesive ribbon or tape for correction, and furthermore, have the following characteristics:

(1) The ink layer in the form of an image is completely peeled off from the substrate by an image forming pressure such as typewriting pressure upon transferring, and the form of image is completely transferred to the recording medium (transferring property);

(2) The mistakenly recorded transferred image can be easily removed by a cohesive ribbon or tape for correction and, upon peeling off the transferred image from the recording medium for correcting, running of oil and the like which becomes a trace of the transferred image are not left on the recording medium (correction property);

(3) During storage, the ink layer does not fall off from the substrate (durability of the ink layer) and the like.

In such an ink ribbon, the transferring ink constituting the ink layer formed on the film substrate may be usually composed of synthetic resin binder material, oily material as a plasticizer for the binder material, coloring agent and the like.

As the plasticizer in the transferring ink, there may be generally used a mineral oil such as liquid paraffin, spindle oil, motor and the like, or a fatty acid ester such as butyl stearate and the like.

Such a plasticizer is added to the ink so as to mainly impart softness to the ink layer and impart a pressure sensitive transferring property to the ink layer. Therefore, the plasticizer should have a function to weaken the resin binder material and a stronger affinity to the recording medium than to the film substrate so as to enable a good transfer, and the affinity should be such that running oil is not left on the recording medium upon correction.

However, in the case where a minimeral oil such as liquid paraffin and the like which are widely used is employed as a plasticizer, there occurs poor transferring such as an incomplete transferring to the recording medium upon transferring at a low temperature, for example, 10° C. and further, running of oil resulting in a trace of a transferred image is left on the recording medium when the transferred ink image is peeled off from the recording medium upon correction.

In addition, where a fatty acid ester such as butyl stearate and the like is used as a plasticizer, running of oil resulting in a trace of a transferred image is disadvantageously left on the recording medium when the transferred image is peeled off from the recording medium upon correction.

SUMMARY OF THE INVENTION

An object of the present invention is to provide a transferring member free from the above-mentioned drawbacks of prior art transferring members.

Another object of the present invention is to provide a correctable pressure sensitive transfer member having improved pressure sensitive transferring property and correction property resulting from improvement in the ink layer.

According to one aspect of the present invention, there is provided a pressure sensitive transfer member comprising a flexible plastic film substrate and a pressure sensitive transferring image forming layer comprising a binder resin, a plasticizer for the binder resin and a coloring agent and overlying the flexible plastic film substrate, the plasticizer being oleyl oleate.

According to another aspect of the present invention, there is provided a method for the pressure sensitive record correction comprising overlying on a recording medium a pressure sensitive transfer member comprising a pressure sensitive ink layer comprising a binder resin, oleyl oleate and a coloring agent overlying a flexible plastic film substrate, pressing imagewise to record an image, and superposing a cohesive correction sheet on a mistakenly recorded image and pressing.

DESCRIPTION OF THE PREFERRED EMBODIMENTS

The present inventor has found that a pressure sensitive transferring ink layer having a good pressure sensitive transferring property at a low temperature as well as room temperature, a good correction property a good durability can be obtained by utilizing oleyl oleate as a plasticizer.

By using oleyl oleate as a plasticizer, the above-mentioned characteristics, that is, (1) transferring property, (2) correction property and (3) durability of the ink layer, can be attained.

The mechanism of function of oleyl oleate as a plasticizer is not yet clear, but the transferred image produced by using the transfer member of the present invention is sharp, and has an appropriate degree of adhesion to the recording medium, and can be appropriately peeled off from the recording medium upon correction, and further there are not such problems that a trace of running of oil is left on the recording medium and the ink layer falls off from the substrate during storage Seemingly the above-mentioned desirable characteristics are attributable to the fact that the number of carbon atoms of oleyl oleate is as many as 36 and oleyl oleate is not hydrolyzed under ordinary circumstance where pressure sensitive transfer members are used and is chemically stable.

As the film substrate for the pressure sensitive transfer member of the present invention, there may be used flexible plastic films, for example, polyolefin such as polyethylene, polypropylene and the like, polyester such as polyethylene terephthalate and the like, and a mixture of such various plastics.

Among them, polyethylene film is preferable since it is so excellent in flexibility that this film can almost completely attach to the surface to be recorded of the recording medium in the pressure transferring step and highly clear and sharp transferred images can be obtained.

These film substrates, if desired, may be colored with a coloring agent such as pigments and the like. Thickness of the film substrate is preferably 5–25 μm, more preferably, 12–18 μm.

The pressure sensitive tranfer member of the present invention can be produced by forming a pressure sensitive transferable ink layer comprising a binder resin, a plasticizer for the binder resin and a coloring agent on such a film substrate.

As the binder resin, there may be used synthetic resins which are solid at room temperature and can be softened or weakened with the plasticizer of this invention such as oleyl oleate, a mixture of oleyl oleate and liquid paraffin and the like. The synthetic resin includes polyamide resins, acrylic resins, vinyl resins, ketone resins and the like. These may be used alone or in combination. Among these resins, thermoplastic resins are particularly preferable which are soluble in a solvent such as alcohol, toluene and the like and excellently economical. Among them, there are preferably used polyamides produced by the reaction of dimer acid and di- or polyamine and having a molecular weight of about 3000–17000, particularly, about 5000–10000, and an amine value of not higher than 10, in particular, 1–5.

According to the present invention, the binder resin is used together with oleyl oleate. The content of the plasticizer in the image forming layer is preferably 20–60% by weight, more preferably, 30–55% by weight.

As the plasticizer, oleyl oleate may be used together with other plasticizer as far as the function of oleyl oleate is not impaired. As such a plasticizer capable of being used together with oleyl oleate, there is preferably mentioned liquid paraffin. Liquid paraffin belongs to a lubricant oil fraction from the standpoint of boiling point and is a liquid saturated hydrocarbon of high purity. There is preferably used liquid paraffin having specific gravity of 0.835–0.886 (15/4° C.), in particular, 0.851–0.876, and viscosity of RW (30° C.) 43–505, in particular, 120–315.

The ratio of oleyl oleate to liquid paraffin is preferably 0.2–6.0 parts: 1 part, more preferably, 0.4–1.5 part: 1 part. When oleyl oleate is less than 0.2 part per 1 part of liquid paraffin, poor low temperature transferring property and running of oil left after peeling off the transferred images attributable to using liquid paraffin alone can not be sufficiently improved. When oleyl oleate is more than 6 parts per 1 part of liquid paraffin, images formed at a high temperature (for example, 30° C.) become somewhat fat.

As a coloring agent used together with the beinder resin and plasticizer, a coloring agent or coloring agents are selected from various pigments and dyes so as to obtain a desired color tone and a desired density. For example, there are used carbon black, magnetic iron oxide, alkali blue and other commercially available coloring agents which have been prepared by color mixing.

The pressure sensitive transferring member of the present invention may be prepared by diluting in an appropriate amount of solvent a pressure sensitive transferring ink composed of the above-mentioned binder resin, oleyl oleate plasticizer, if desired, additives such as surfactants and the like, applying the ink thus diluted to a film substrate, and drying the ink thus applied to form a pressure sensitive transferring ink layer. The thickness of the pressure sensitive ink layer is preferably such that flexibility of the film substrate is not impaired, for example, 1.5–4.0 g/m$^2$.

As mentioned above, according to the present invention, there is provided a pressure sensitive transfer member having a good transferring property at room temperature and low temperatures, and free from running of oil on a recording medium upon correction and falling-off of the ink layer form the substrate during storage. The pressure sensitive transfer member has been originally developed as a correctable transfer member, but it is also possible to use as a not-correctable transfer member utilizing the excellent transferring property.

EXAMPLE 1

TABLE 1

| Component | Amount (parts) | Content of Solid Matter (wt. %) |
|---|---|---|
| Polyamide resin | 6.5 | 41.7 |
| Oleyl oleate | 6.5 | 41.7 |
| Carbon black | 2.6 | 16.6 |
| Isopropyl alcohol | 84.4 | — |
| Total | 100.0 | 100.0 |

Polyamide resin and isopropyl alcohol were mixed and thermally melted until the resin dissolved. The thus obtained solution was transferred to a sand mill and oleyl oleate and carbon black were added thereto and mixed therewith. This mixed solution was triturated, until a uniform composition formed, to prepare the composition as shown in Table 1.

The composition was directly coated on a polyethylene film substrate of 15 μm in thickness, and the solvent in the composition was evaporated, until the composition was dried, to form a pressure sensitive transfer member having a image forming layer of about 3 g/m$^2$ coating.

Even after standing for a long period (12 months), the image forming layer did not fall off from the film substrate and adhesion to the substrate was very good. When this transfer member was used as an ink ribbon in a typewriter, the only portion to be transferred of the image forming layer was peeld off entirely from the film substrate, and the peeled-off portion was entirely transferred on a recording medium and the transferred image formed on the medium was very sharp and excellent. Further, when the transferred image on the recording medium was corrected, there was observed no oil running whatsoever to indicate trace of the transferred image on the recording medium.

Such excellent transfer property was consistently unchanged when used immediately after manufacture of the transfer member and also when storaged for a long period before using.

COMPARATIVE EXAMPLE 1

A pressure sensitive transfer member was manufactured according to the same procedure as in Example 1 except that butyl stearate was used in place of oleyl oleate. The resulting transfer member was evaluated in a similar way as in Example 1. As a result, a problem of a long period of strage, that is, storage property did not occur similarly to the case where oleyl oleate was used. But, when this transfer member was used in a typewriter, problems occurred such as a part of the image forming layer was left unremoved on the substrate and the sharpness of the transferred image was impaired, even immediately after manufacture of the transfer member. When the transferred image was corrected, problems occurred such as oil running was left on the recording medium. Therefore, the transfer property of the material can not be compared with that in Example 1.

Both of butyl stearate and oleyl oleate were a fatty acid ester. However, as described above, problems occurred that a part of the image forming layer was left unremoved on the substrate, that is, the defective print occurred, and the sharpness of the transferred image was impaired. Especially, the oil running that is, the trance, during the correction in which a pigment (carbon black in this case) was dispersed was left on the recording medium. Therefore, the trace after the correction of a miswritten character could be read distinctly. Correction of a miswritten character was imperfect.

The present invention in which oleyl oleate was used as a plasticizer was perfectly free from faults caused by using butyl stearate as described above. That is, the printed image was very sharp and any defective print did not occur. Further, the oil running was not observed entirely, and thus, the trace after the correction of a miswritten character was not found at all.

COMPARATIVE EXAMPLE 2

The composition in Table 2 was prepared with the same components as and by the same procedure as in Example 1 except that rapeseed oil was used in place of oleyl oleate in Example 1 and zinc stearate was used as a gelling agent of the rapeseed oil.

A pressure sensitive transfer member provided with an image forming layer having the same coating amount was manufactured by coating the composition on the same substrate as in Example 1.

Similarly to the case where oleyl oleate was used, the image forming layer did not fall off from the substrate. However, since rapeseed oil has weak plasticity and strong film-forming property, a gelling agent for relating the film-forming property is used required for perfectly transferring the image on the recording medium by pressure for forming the image during the transfer. In this Comparative example, zinc stearate was used from the standpoints of effect and economy. The composition containing zinc stearate had the faults as described in Comparative example 1.

TABLE 2

| Component | Amount (parts) | Content of Solid (wt. %) |
|---|---|---|
| Polyamide resin | 6.5 | 40.6 |
| Rapeseed oil | 6.5 | 40.6 |
| Zinc stearate | 0.4 | 2.5 |
| Carbon black | 2.6 | 16.3 |
| Naphthalide | 20.0 | — |

TABLE 2-continued

| Component | Amount (parts) | Content of Solid (wt. %) |
|---|---|---|
| Heptane | 28.0 | — |
| Isopropyl alcohol | 36.0 | — |
| Total | 100.0 | 100.0 |

That is, problems occurred that the defective print occurred and the sharpness of the transferred image was impaired resulting from, especially, the influence of the gelling agent.

On the contrary, this invention in which oleyl oleate was used as a plasticizer provides a novel and practically useful transfer member that the defective print did not occur, the sharpness of the transferred image was not impaired, oil running during the correction was not left, and a long period of storage was sufficiently possible when used as a ink ribbon.

EXAMPLE 2

TABLE 3

| Component | Amount (parts) | Ratio in Ink Layer (wt. %) |
|---|---|---|
| Polyamide resin | 6.0 | 35.3 |
| Liquid paraffin | 4.8 | 28.2 |
| Oleyl oleate | 3.6 | 21.2 |
| Carbon | 2.6 | (15.3) |
| Isopropyl alcohol | 83.0 | — |
| Total | 100.0 | 100.0 |

Polyamide resin and isopropyl alcohol were mixed according to respective amount in Table 3 and thermally melted until the resin dissolved. The thus obtained solution was transferred to a sand mill and liquid paraffin, oleyl oleate and carbon black were added thereto and mix therewith. This solution was mixed, until a uniform composition formed, to prepare the composition as shown in Table 3.

The composition was directly coated on a polyethylene film substrate of 15 μm in thickness, and the solvent was evaporated, until the coated film dried, to form a pressure sensitive transfer member having a ink layer of 3 $g/m^2$ coating.

Even after standing for a long period (12 months), the ink layer did not fall off from the film substrate and adhesion to the substrate was very good. When this transfer member was used as an ink ribbon in a typewriter under the condition of normal or low temperature, only portion of the ink layer to which pressure is applied was peeled off entirely from the film sabstrate, and the peeled-off portion was entirely transferred on a recording medium and the transferred image formed on the medium was very sharp and excellent. Further, when the transferred image on the recording medium was removed by an cohesive ribbon for correction, there was observed no oil running whatsoever to indicate trace of the transferred image on the recording medium.

Such excellent transfer property was consistently unchanged when used immediately after manufacture of the transfer material and also when storaged for a long period before using.

COMPARATIVE EXAMPLE 3

TABLE 4

| Component | Amount (parts) | Ratio in Ink Layer (wt. %) |
|---|---|---|
| Polyamide resin | 6.0 | 35.3 |
| Liquid paraffin | 8.4 | 49.4 |
| Carbon black | 2.6 | 15.3 |
| Isopropyl alcohol | 83.0 | — |
| Total | 100.0 | 100.0 |

A pressure sensitive transfer member was manufactured according to the same procedure as in Example 2 except for using liquid paraffin of amount as described in Table 4 corresponding to total amount of liquid paraffin and oleyl oleate in Example 2.

When this transfer member was used in a typewriter under the condition of low temperature (10° C.), problem occurred that a part of the ink layer was left unremoved on the substrate. Thus, the transfer was imperfect. Also when the transferred image was corrected, problem occurred that oil running was left on the recording medium. Thus, the correction property of the member was evidently worse than that in Example 2.

COMPARATIVE EXAMPLE 4

TABLE 5

| Component | Amount (parts) | Ratio of Ink Layer (wt. %) |
|---|---|---|
| Polyamide resin | 6.0 | 35.3 |
| Butyl stearate | 8.4 | 49.4 |
| Carbon black | 2.6 | 15.3 |
| Isopropyl alcohol | 83.0 | — |
| Total | 100.0 | 100.0 |

A pressure sensitive transfer material was manufactured according to the same procedure as in Example 2 except for using butyl stearate of amount described in Table 5 corresponding to total amount of liquid paraffin and oleyl oleate in Example 2.

In the case where this transfer material was used in a typewriter, there was observed oil running to indicate trace of the transferred image on the recording medium when the image was peeled off from the recording medium during correction. Thus, the removal of a miswritten character was imperfect.

What is claimed is:

1. A pressure sensitive transfer member which comprises a flexible plastic film substrate and a pressure sensitive transferring image forming layer comprising a binder resin, a plasticizer for the binder resin and a coloring agent and overlying the flexible plastic film substrate, the plasticizer being oleyl oleate.

2. The member according to claim 1 in which liquid paraffin is additionally used as the plasticizer.

3. The member according to claim 1 in which the content of the plasticizer in the image forming layer is 20–60% by weight.

4. The member according to claim 1 in which the binder resin is polyamide resin.

5. The member according to claim 4 in which the polyamide resin is a thermoplastic polyamide resin.

6. A method for the pressure sensitive record correction which comprises overlaying on a recording medium a pressure sensitive transfer member comprising a pressure sensitive transferring ink layer comprising a binder resin, oleyl oleate and a coloring agent overlying a flexible plastic film substrate, pressing imagewise to record an image, and superposing a cohesive correction sheet on a mistakenly recorded image and pressing to peel off the mistakenly recorded from the recording medium.

* * * * *

UNITED STATES PATENT AND TRADEMARK OFFICE

CERTIFICATE OF CORRECTION

PATENT NO. : 4,605,593

DATED : August 12, 1986

INVENTOR(S) : FUMIO IIDA

It is certified that error appears in the above-identified patent and that said Letters Patent is hereby corrected as shown below:

COLUMN 1

Line 20, "difficult" should read --different--.

COLUMN 4

Line 20, "form" should read --from--.

COLUMN 5

Line 8, "strage," should read --storage,--.
Line 26, "trance," should read --trace,--.

COLUMN 8

Line 35, "mistakenly recorded" should read --mistakenly recorded image--.

Signed and Sealed this

Twenty-fifth Day of April, 1989

*Attest:*

DONALD J. QUIGG

*Attesting Officer*

*Commissioner of Patents and Trademarks*